United States Patent [19]

Gruden

[11] Patent Number: 4,811,708
[45] Date of Patent: Mar. 14, 1989

[54] COMBUSTION SPACE FOR A RECIPROCATING PISTON INTERNAL COMBUSTION ENGINE

[75] Inventor: Dusan Gruden, Ditzingen, Fed. Rep. of Germany

[73] Assignee: Dr. Ing. h.c.F. Porsche Aktiengesellschaft, Stuttgart, Fed. Rep. of Germany

[21] Appl. No.: 150,012

[22] Filed: Jan. 29, 1988

[30] Foreign Application Priority Data

Jan. 31, 1987 [DE] Fed. Rep. of Germany ....... 3702899

[51] Int. Cl.⁴ .............................................. F02B 23/10
[52] U.S. Cl. .................................... 123/299; 123/276; 123/302; 123/661
[58] Field of Search ............... 123/299, 661, 276, 302, 123/305

[56] References Cited

U.S. PATENT DOCUMENTS 1,960,362  5/1934  Woolson .......................... 123/299
2,338,959  1/1944  Nallinger et al. .................. 123/299
2,803,237  8/1957  Burch ................................ 123/661
3,633,577  1/1972  Piatti ................................. 123/662
3,999,532 12/1976  Kornhauser ....................... 123/276
4,123,997 11/1978  Oswald et al. ..................... 123/305

FOREIGN PATENT DOCUMENTS 476846  5/1929  Fed. Rep. of Germany .
1142711  9/1957  France ............................. 123/276
726450  3/1955  United Kingdom .............. 123/661

Primary Examiner—Andrew M. Dolinar
Attorney, Agent, or Firm—Barnes & Thornburg

[57] ABSTRACT

A combustion space of a reciprocating piston internal combustion engine in which the combustion development of the internal combustion engine, as also the knock limit, is positively influenced by a defined configuration of the combustion space and arrangement of the ignition and injection devices, and more particularly in such a manner that the fuel necessary for the operation of the internal combustion engine can be characterized by a lower octane number.

9 Claims, 1 Drawing Sheet

COMBUSTION SPACE FOR A RECIPROCATING PISTON INTERNAL COMBUSTION ENGINE

BACKGROUND AND SUMMARY OF THE INVENTION

The present invention relates to a combustion space for a reciprocating piston internal combustion engine which is provided between a cylinder head and a piston and is equipped with one or several ignition and injection devices, whereby the gas-exchange control in the combustion space takes place by two inlet valves and two exhaust valves of the cylinder head.

A combustion space is disclosed in the U.S. Pat. No. 4,484,550 which is provided in the cylinder head and includes a spark plug arranged in the center longitudinal axis of the cylinder. Additionally, the cylinder head includes two inlet valves and two exhaust valves.

It is the object of the present invention to favorably influence the combustion progress in the combustion space by geometric configuration measures as well as arrangement of the ignition and injection devices.

The underlying problems are solved according to to the present invention in that the ignition device extends in a center longitudinal axis of the cylinder, the injection devices extend essentially at the same angle to the center longitudinal axis of the cylinder, the piston includes a spherically shaped recess on the side facing the cylinder head whose radius is located on the center longitudinal axis of the cylinder, and the piston is extended on the side facing the cylinder head up to a roof-shaped combustion space boundary of the cylinder head outside of the recess for the formation of a squeeze area.

The principal advantages achieved with the present invention reside in that the progress of the flame-development phase and the heat release is improved by the arrangement of the ignition and injection devices as well as the configuration of the combustion space. In particular, it is assured that during the main combustion phase the flame expands uniformly in all directions, starting from the spark plug. It is additionally achieved with this construction that the knock limit of the internal combustion engine is such that the fuel required for the operation of the internal combustion engine can be characterized by a low octane number.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
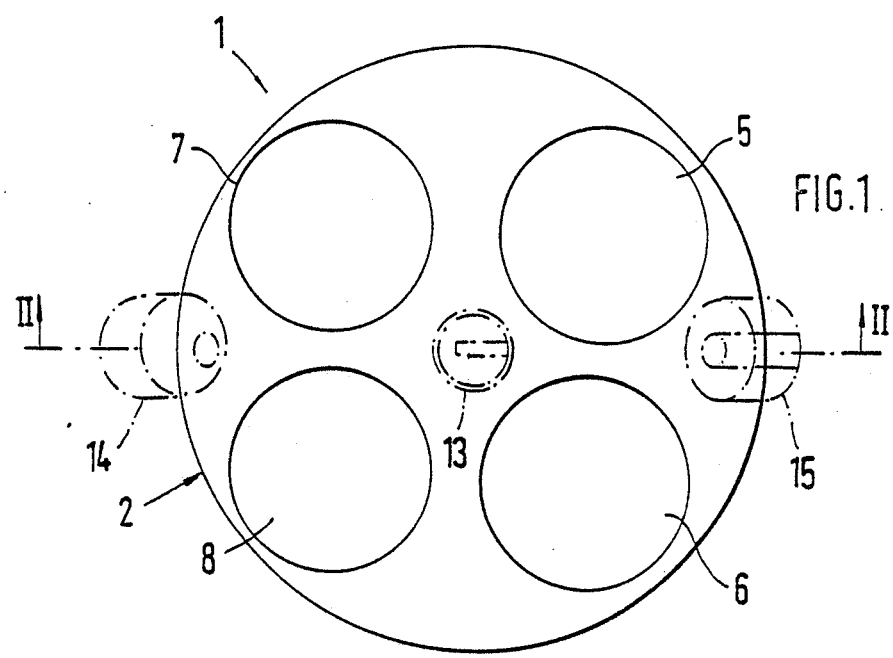
FIG. 1 is a schematic top plan view on a cylinder of an internal combustion engine according to the present invention.

Referring now to the drawing wherein like reference numerals are used throughout the two views to designate like parts, of the multi-cylinder internal combustion engine generally designated by reference numeral 1, only one cylinder generally designated by reference numeral 2 is illustrated which is provided in a cylinder crankcase 3. The cylinder crankcase 3 combines on the side opposite the crank drive (not shown) a cylinder head 4 which includes two inlet valves 5 and 6 and two exhaust valves 7 and 8. The gas-exchange control in a combustion space 9 takes place by way of these valves which are actuated by one or two cam shafts (not shown); the combustion space 9 is provided between a piston 11 installed into a bore 10 and the cylinder head 4.

On the side of the cylinder head 4, the combustion space 9 includes a roof-shaped combustion space boundary 12 whereby the angular position A and B of the inlet and exhaust valves 4, 5, respectively, 6, 7, normally at right angle to the surface of the combustion space boundary, is defined by this combustion space boundary 12. An ignition device (spark plug) is designated by reference numeral 13 which extends in a center longitudinal axis C—C of the cylinder 2. Additionally, injection devices 14 and 15 are inserted into the cylinder head 4 which are each arranged between the inlet and the exhaust valves 5, 6, respectively, 7, 8, whereby they extend at a more inclined angle D and E than the inlet and exhaust valves. The injection valves 14 and 15—like the valves—, are arranged essentially under the same angle with respect to the center longitudinal axis C—C.

The piston 11 is provided with a spherically shaped recess 16 which contributes to the formation of the combustion space 9 on the side of the piston. The size (the volume) of the recess is defined by the following relationship:

$$R = (0.25 - 0.45) D$$

R is thereby the radius of the spherically shaped recess 16 and D the diameter of the piston 11 and/or of the bore 10 of the cylinder 2.

Figure 2:
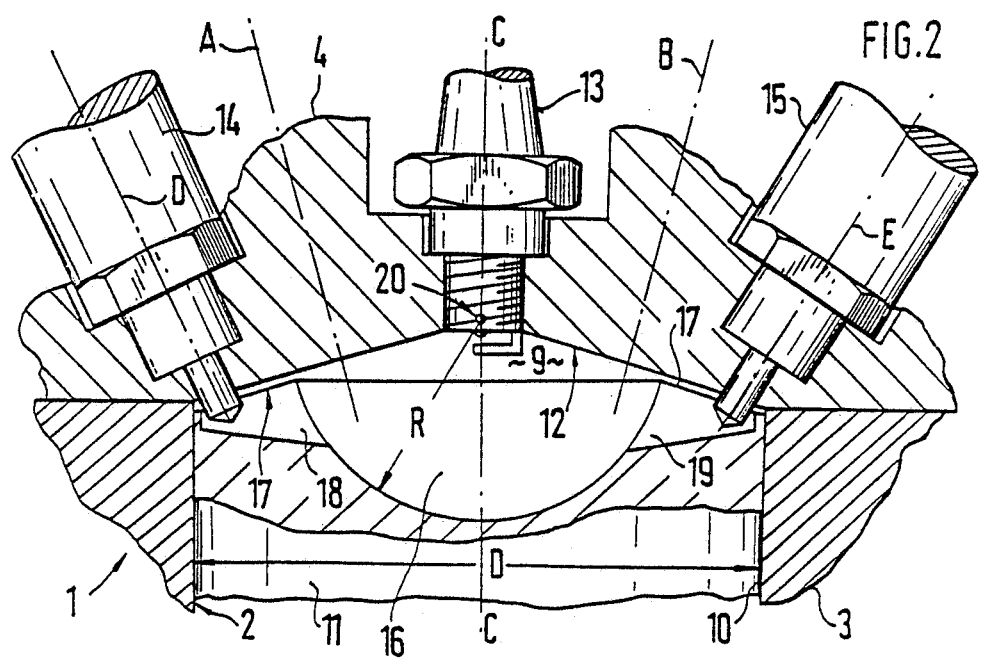
FIG. 2 is a cross-sectional view taken along line II—II of FIG. 1.

It can be seen from FIG. 2 that the point of origin of the radius R lies approximately at the peak 20 of the roof-shaped combustion space boundary 12.

Outside of the recess 16, the piston 11 is extended close to the combustion space boundary 12 and forms a squeeze area 17 whereby its size amounts to at least 12% of the area of the Piston 11. Finally, the piston 11 is provided within the area of the injection devices 14 and 15 with recesses 18 and 19.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A combustion space for a reciprocating piston internal combustion engine which is provided between a cylinder head and a piston and is equipped with ignition and plural injection means, the gas-exchange control in the combustion space taking place by two inlet valves and two exhaust valves of the cylinder head, the ignition means extending in a center longitudinal axis of the cylinder, each injection means extending essentially at an identical angle to the center longitudinal axis of the cylinder, the piston including on the side facing the cylinder head a substantially spherically shaped recess whose radius lies substantially on the center longitudinal axis of the cylinder, and the piston extending on the side facing the cylinder head outside of the recess up to a roof-shaped combustion space boundary of the cylinder head for the formation of a squeeze area.

2. A combustion space according to claim 1, wherein the size of the spherically shaped recess is determined by the following relationship $$R = (\text{about } 0.25 \text{ to about } 0.45) D$$

whereby R is the radius of the recess and D the diameter of the piston and/or of the bore of the cylinder.

3. A combustion space according to claim 2, wherein the point of origin of the radius of the recess is located approximately on the peak of the combustion space boundary.

4. A combustion space according to claim 1, wherein the piston includes recesses within the area of the injection means.

5. A combustion space according to claim 1, wherein the size of the squeeze area amounts to at least 12% of the piston area.

6. A combustion space according to claim 3, wherein the piston includes recesses within the area of the injection means.

7. A combustion space according to claim 6, wherein the size of the squeeze area amounts to at least 12% of the piston area.

8. A combustion space according to claim 2, wherein the piston includes recesses within the area of the injection means.

9. A combustion space according to claim 2, wherein the size of the squeeze area amounts to at least 12% of the piston area.

* * * * *